United States Patent
Minster et al.

(10) Patent No.: US 9,218,180 B2
(45) Date of Patent: Dec. 22, 2015

(54) ACCELERATED SOFTWARE SERVICES DELIVERY SYSTEM

(75) Inventors: Randy Williams Minster, Fort Collins, CO (US); Michael James Hake, Fort Collins, CO (US); Libby Bobette Chang, Fort Collins, CO (US); Haritha Panuganti, Longmont, CO (US); John Joseph Hubert, Fort Collins, CO (US); Jonathan Orell Nelson, Fort Collins, CO (US); Luke Thomas Moss, Fort Collins, CO (US)

(73) Assignee: Integware, Inc., Fort Collins, CO (US)

( * ) Notice: Subject to any disclaimer, the term of this patent is extended or adjusted under 35 U.S.C. 154(b) by 0 days.

(21) Appl. No.: 14/241,414

(22) PCT Filed: Jul. 13, 2012

(86) PCT No.: PCT/US2012/046680
§ 371 (c)(1),
(2), (4) Date: Feb. 26, 2014

(87) PCT Pub. No.: WO2013/012726
PCT Pub. Date: Jan. 24, 2013

(65) Prior Publication Data
US 2014/0298292 A1  Oct. 2, 2014

Related U.S. Application Data

(60) Provisional application No. 61/572,415, filed on Jul. 15, 2011.

(51) Int. Cl.
*G06F 9/44* (2006.01)
*G06F 9/445* (2006.01)

(52) U.S. Cl.
CPC .............. *G06F 8/71* (2013.01); *G06F 9/4451* (2013.01)

(58) Field of Classification Search
CPC .............................. G06F 8/71; G06F 9/4451
USPC ................................................... 717/120–123
See application file for complete search history.

(56) References Cited

U.S. PATENT DOCUMENTS

| 5,844,554 | A | 12/1998 | Geller et al. | |
|---|---|---|---|---|
| 6,279,154 | B1 * | 8/2001 | Davis | 717/174 |
| 6,668,375 | B1 | 12/2003 | Leovac | |
| 7,543,269 | B2 | 6/2009 | Krueger et al. | |
| 7,594,225 | B2 * | 9/2009 | Barr et al. | 717/174 |
| 7,721,259 | B2 | 5/2010 | Heinke et al. | |

(Continued)

FOREIGN PATENT DOCUMENTS

WO  WO 00/17789  3/2000

OTHER PUBLICATIONS

U.S. Appl. No. 61/572,415, filed Jul. 15, 2011.

(Continued)

*Primary Examiner* — Qing Chen
(74) *Attorney, Agent, or Firm* — Craig R. Miles; CR Miles P.C.

(57) ABSTRACT

A system and computer implemented method for producing a user configuration profile of a software configuration including software configuration modifications selected by a user which read by an installer engine in comparison to the software configuration allows installation of an updated software configuration including the software configuration modifications selected by the user.

8 Claims, 7 Drawing Sheets

(56) References Cited

U.S. PATENT DOCUMENTS

| | | |
|---|---|---|
| 8,028,902 B2 | 10/2011 | Ferrara et al. |
| 2006/0265706 A1* | 11/2006 | Isaacson et al. ............... 717/174 |
| 2007/0169114 A1* | 7/2007 | Birk Olsen et al. ............ 717/174 |
| 2008/0028389 A1* | 1/2008 | Genty et al. ................... 717/174 |
| 2008/0052706 A1* | 2/2008 | Isaacson ........................ 717/174 |
| 2008/0163199 A1* | 7/2008 | Rao et al. ...................... 717/177 |
| 2009/0037875 A1* | 2/2009 | Jones et al. .................... 717/109 |
| 2009/0198727 A1 | 8/2009 | Duan et al. |
| 2009/0307650 A1 | 12/2009 | Saraf et al. |

OTHER PUBLICATIONS

PCT Interantional Patent Application No. PCT/US2012/046680, filed Jul. 13, 2012.

\* cited by examiner

ACCELERATED SOFTWARE SERVICES DELIVERY SYSTEM

This application is the United States National Stage of International Patent Cooperation Treaty Patent Application No. PCT/US2012/046680, filed Jul. 13, 2012, which claims the benefit of U.S. Provisional Patent Application No. 61/572,415, filed Jul. 15, 2011, each hereby incorporated by reference herein.

TECHNICAL FIELD

A system and computer implemented method for producing a user configuration profile of a software configuration including software configuration modifications selected by the user which read by an installer engine in comparison to the software configuration allows installation of an updated software configuration which includes the software configuration modifications selected by the user.

BACKGROUND

A significant portion of software is delivered to customers through services. This typically means the software is written or customized specifically for each customer's needs. The advantage of this approach may be that customers get the functionality they desire because the software is customized to their requirements. The downside may be that customized software typically takes a great deal of time to develop and may be costly to maintain.

Many businesses have a need to decrease their software deployment and maintenance costs. One approach to enable this may be to deploy "out-of-the-box" (OOTB) software as is, without customization. This eliminates the cost of custom development and also reduces the software support costs. Software written to a specific customer costs more to maintain as opposed to software sold "as is" to multiple customers and across whom much of the support cost can be shared. The down side of this approach may be that some customers have very specific requirements pertaining to their business processes that may not be met by a software package OOTB. Accordingly, a substantial problem with conventional means of delivering custom software can be that it is too costly both in its development and maintenance since the software is written specifically for a single customer.

Another substantial problem with conventional means of delivering custom software can be that the focus is primarily on delivering strictly OOTB software, as is, with no customization. Such an approach typically provides a fast delivery time, but it is often too limited and inflexible in offering extensions to the software's built in business processes.

Another substantial problem with delivering custom software, whether customized or OOTB, can be over-configuration of the software. Generally, as to customized or OOTB software, all allowable configuration capability may be available for the user to set up or specify. However, not all configuration aspects of a software product are equal. A fair amount of time can be spent on configuration that may be trivial or offer little business return for the investment.

Conventional approaches to address these problems and to speed up the deployment process have utilized automation and configuration front-ends to reduce time and costs such as described in U.S. Pat. No. 7,543,269. However, this approach does not focus on ensuring that the configuration aspects that are exposed are those that embody best business practices for the software being delivered.

There has also been work done on simplifying the configuration process to ensure the entered data is valid and does not conflict, such as the approach described in United States Patent Application Publication No. 2007/0267484 A1. This approach reduces the customizations that are exposed based on what options apply given earlier configuration inputs. This is an important aspect of efficient configuration, but the approach does not take into context the full deployment process or the initial need to constrain configuration options based on business needs and best practices.

There remains a unresolved need for a system and method of modifying a software configuration with user selected software configuration modifications and building an installer capable of installing the modified software configuration to provide an updated software configuration for the user.

DISCLOSURE OF INVENTION

Accordingly, a broad object of embodiments of the invention can be to provide a system which includes a software configuration modification program stored in a memory and a processor in communication with the memory, the program executable to read a software configuration in a configuration repository and to generate a baseline configuration profile of the software configuration, and further executable to generate a user interface which allows selection of software configuration modifications for the baseline configuration profile and concurrently generates a user configuration profile of the software configuration modified by the selected software configuration modifications, and further executable to build an installer which reads the user configuration profile in comparison to the software configuration existing in the configuration repository and installs an updated software configuration including the software configuration modifications selected by the user.

Another broad object of embodiments of the invention can be to provide a computer system for modifying a software configuration which includes a configuration repository which stores a software configuration read by a baseline configuration profile generator which creates a baseline configuration profile of the software configuration, and which can further includes a user configuration profile generator which provides a user interface, such as a graphical user interface, capable of interaction with a user to select software configuration modifications for the baseline configuration profile, a dependency engine functions to identifies configuration dependent schema concurrent with user selection of the software configuration modifications by interaction with the user interface, and a user configuration profile parser which generates a user configuration profile of the software configuration including software configuration modifications selected by the user, and which can further includes an installer engine which builds an installer executable to install an updated software configuration including software configuration modifications selected by the user.

Another broad object of embodiments of the invention can be to provide a method in a computer system for modifying a software configuration which includes reading a software configuration retrieved from a configuration repository and parsing the software configuration into a common format for generating a baseline configuration profile which includes all the files which represent the software configuration, and can further include generating a user interface (which as to particular embodiments can be a graphical user interface for depiction on a display surface) capable of interaction with a user to select software configuration modifications for the baseline configuration profile, and can further include identifying configuration dependent schema based on the user selected software configuration modifications and parsing the baseline software configuration including the selected software configuration modifications and further generating a user configuration profile which includes all the files which represent the software configuration including the software configuration modifications selected by the user, and can further include building an installer for the user configuration profile and installing an updated software configuration which includes the software configuration and the software configuration modifications selected by the user.

Naturally, further objects of the invention are disclosed throughout other areas of the specification, drawings, photographs, and claims.

MODE(S) FOR CARRYING OUT THE INVENTION

Figure 1:
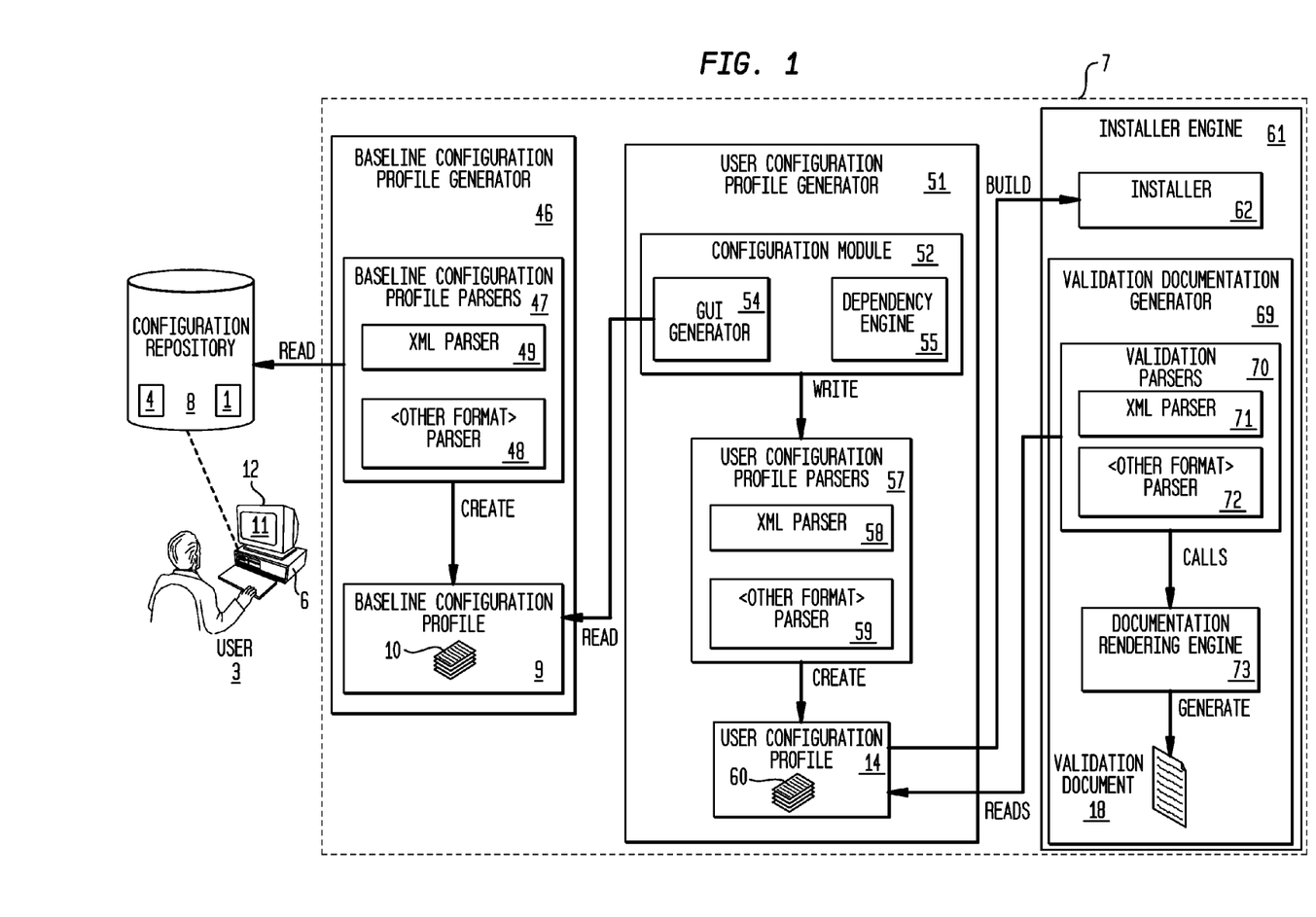
FIG. 1 is an illustration of a particular method of updating a software configuration with software configuration modifications to produce an updated software configuration utilizing a computer executable code the form of software configuration modification program.
Figure 2:
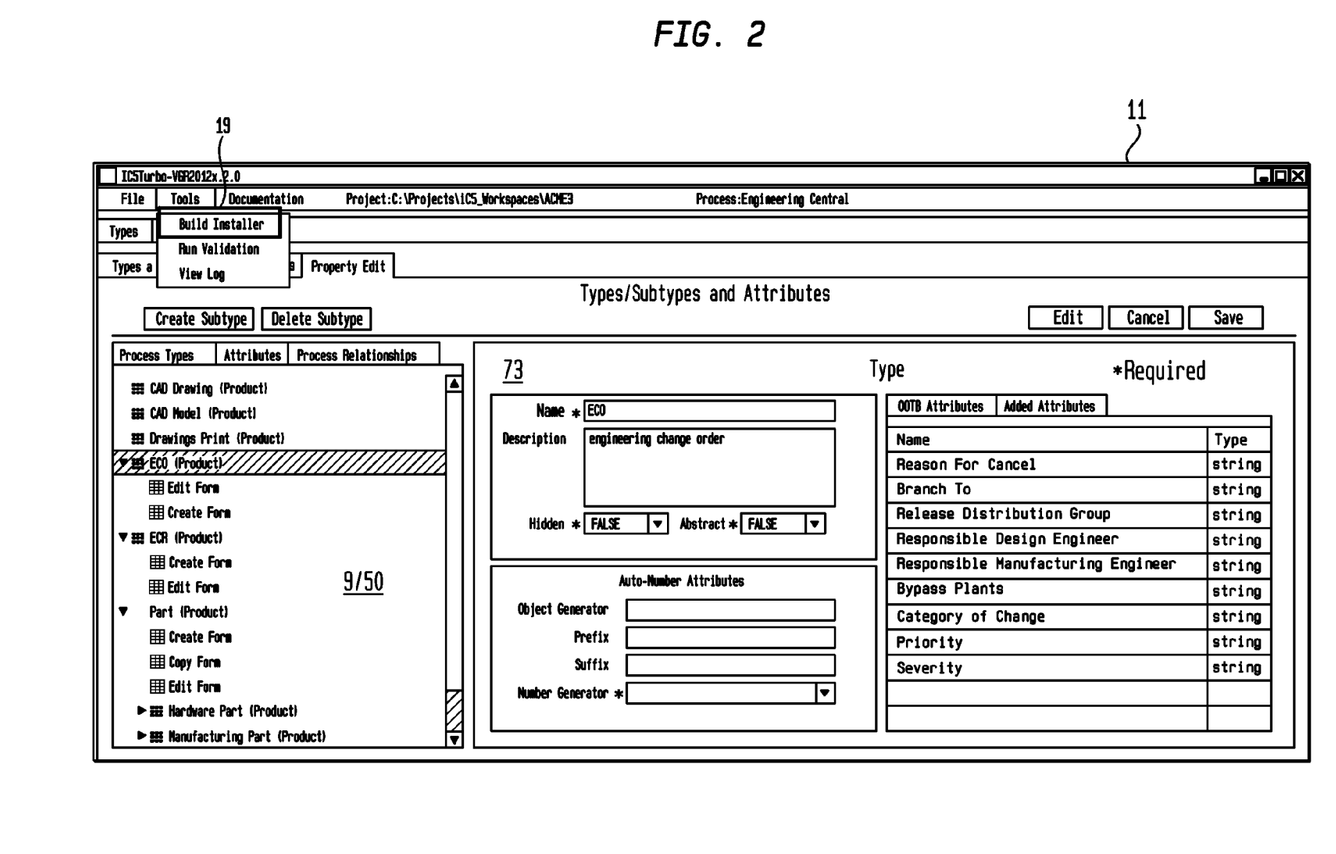
FIG. 2 is an illustration of a particular embodiment of a graphical user interface capable of interaction with a user to select software configuration modifications.

Now referring primarily to FIGS. 1 and 2, which provides an example of a system and a method for modifying a software configuration (1) to include software configuration modifications (2) selected by a user (3) and installing the software configuration modifications (2) to generate an updated software configuration (4).

For the purposes of the instant invention the term "software configuration" means the current version of a particular set of files stored in a memory element (5) of a computer (6). For the purposes of the instant invention the term "software configuration modifications" means a change which can be made in the structure of the software configuration (1). For the purposes of the instant invention the term "updated software configuration" means the software configuration (1) modified by inclusion of the software configuration modifications (2).

Figure 5:
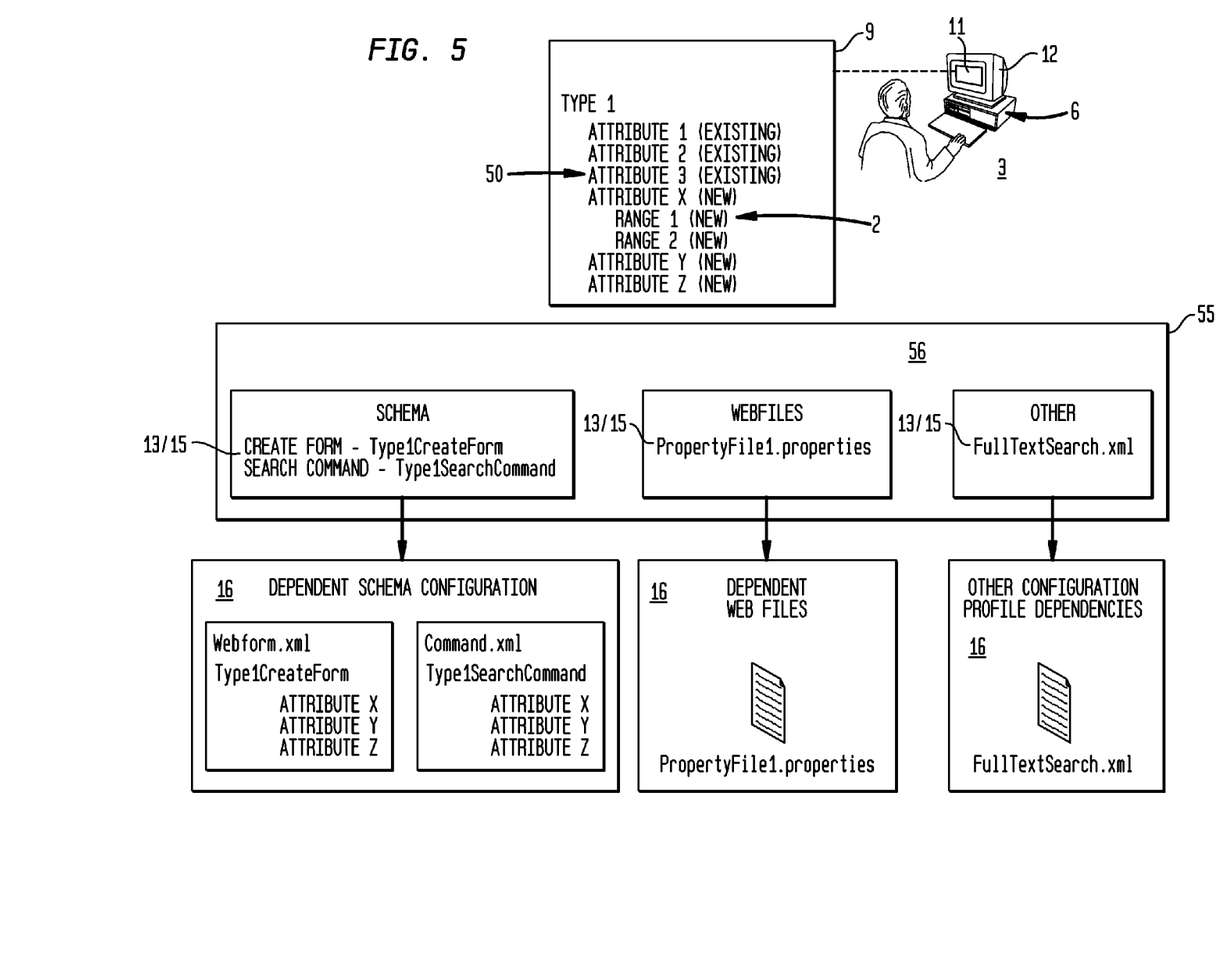
FIG. 5 is an illustration of an exemplary dependency engine generating dependent schema configurations.

A user (3) can utilize a computer (6) having a memory element (5). The memory element (5) can include a computer code (7) executable to validate and install software configuration modifications (2) on the software configuration (1) to generate an updated software configuration (4) (the executable computer code also referred to as the "software configuration modification program (7)" or the "program (7)). The user (3) can activate the software configuration modification program (7) to read the software configuration (1) stored in a configuration repository (8) of the memory element (5) of the computer (6) and to generate a baseline configuration profile (9) of the software configuration (1). For the purposes of the instant invention the term "baseline configuration profile" means a listing of all the software configuration files (10) that represent the current version of the software configuration (1) stored in the configuration repository (8), the listing can be divided into schema (50) such as types, attributes, web forms, tables, commands, or the like (as shown in the example of FIG. 5).

Again referring primarily to FIGS. 1 and 2, as to particular embodiments, the program (7) can further function to generate a user interface (11) which as to particular embodiments can be a graphical user interface (11) for depiction on a display surface (12) viewable by the user (3)(as shown in the example of FIG. 2). The user (3) can interact with the user interface (11) to select software configuration modifications (2) to apply to the baseline configuration profile (9). The term "selects" encompasses any action by the user (3) interactive with the user interface (11)(or graphical user interface) which allows entry of software configuration modifications (2).

As the user (3) selects software configuration modifications (2) by interaction with the user interface (11) the program (7) concurrently functions to identify and capture dependent schema (13) based on user (3) selected software configuration modifications (2) to be applied to the baseline configuration profile (9). The program can further function to generate a user configuration profile (14) of the software configuration (1) modified by the software configuration modifications (2) selected by the user (3). As to particular embodiments of the method, the program (7) can apply dependent schema definitions (15) on user (3) selected software configuration modifications (2) to generate dependent schema configurations (16) and automatically update the identified dependent schema (13) concurrent with the user (3) selection of software configuration modifications (2) for the baseline configuration profile (9).

Again referring primarily to FIGS. 1 and 2, the program (7) can further function to generate and execute schema installation commands (17) to install the user configuration profile (14) of the software configuration (1) including the software configuration modifications (2) selected by the user (3). As to particular embodiments, the user (3) can interact with the a graphical user interface (11) to activate the program (7)(as shown in the example of FIG. 2 by click event on a "Build Installer" icon (19)) which reads the software configuration (1) as currently stored in the configuration repository (8) and reads the user configuration profile (14) generated by the program (7) based on selected software configuration modifications (2). The program (7) compares the user configuration profile (14) to the software configuration (1) currently stored in the configuration repository (9) and based on differences between the user configuration profile (14) and the software configuration (1) generates schema installation commands (17). The program (7) can further function to execute the schema installation commands (17) to install the user configuration profile (14) to update the software configuration (1) to include the software configuration modifications (2) selected by the user (3) to create an updated software configuration (4).

Again referring primarily to FIGS. 1 and 2, the program (7) is further executable to validate the user configuration profile (14) by rendering a validation document (18) representing the software configuration modifications (2) selected by the user (3). As to particular embodiments, the user (3) can interact with the graphical user interface (11)(or other interface) to activate the program (7)(as shown in the example of FIG. 2 by click event on the "Build Installer" icon (19)) to activate the program (7) which reads the user configuration profile (9) and parses the user configuration profile (9) into a parsed documentation format (20). The program (7) then functions to read the parsed documentation format (20) and renders the validation document (18). For the purposes of this invention, the term "validation document" means a plain text document which includes software configurations created by the user (3). As to particular embodiments, the user (3) can validate the user configuration profile (9) prior to activating the installer (62) which functions to install the user configuration profile (14).

Figure 3:
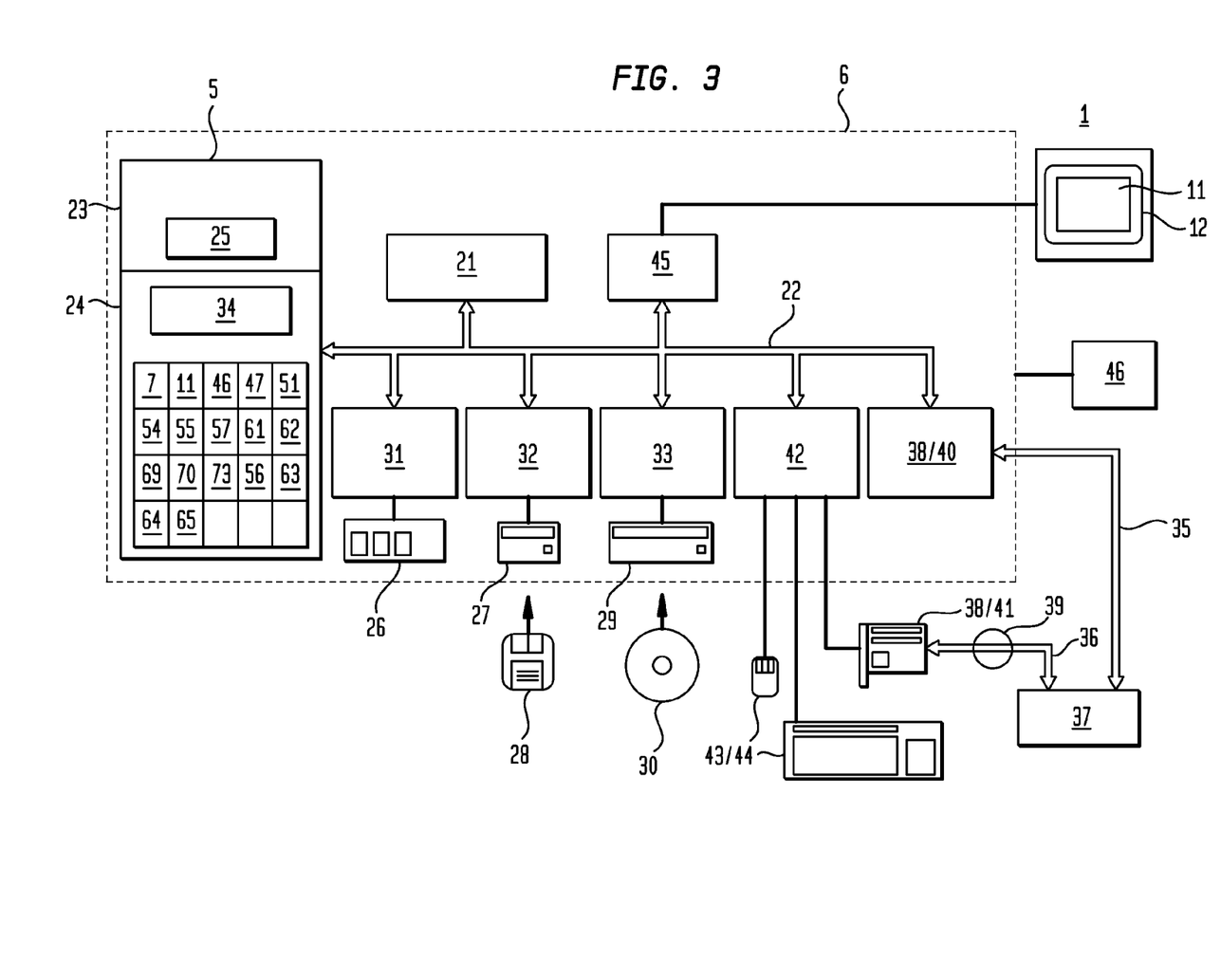
FIG. 3 is an illustration of computer hardware elements and software elements which operate to perform the method illustrated in FIG. 1.

Now referring primarily to FIG. 3, embodiments of the above described method can be performed in a computer (6) in which the software configuration modification program (7) can be stored in a memory (5). The computer (6) can have a processor (21) in communication with the memory (5) to execute the program (7). The computer (6) can include certain network means, and computer readable media which can be utilized to practice embodiments of the invention. It is not intended that embodiments of the invention be practiced in only wide area computing environments or only in local area computing environments, but rather the invention can be practiced in local area computing environments or in distributed computing environments where functions or tasks are performed by remote processing devices that are linked through a communications network. In a distributed computing environment, program modules may be located in both a local or in a remote memory storage device(s) or device elements. While a preferred embodiment of the invention is described in the general context of computer-executable instructions of the software configuration modification program (7) and program modules which utilize routines, programs, objects, components, data structures, or the like, to perform particular functions or tasks or implement particular abstract data types, or the like, being executed by the computer means and network means, it is not intended that any embodiments of the invention be limited to a particular set of computer-executable instructions or protocols. As to particular embodiments, the computer (6) can take the form of a limited-capability computer designed specifically for updating a software configuration (1). The computer (6) can include hardware such as set-top boxes, intelligent televisions connected to receive data through an entertainment medium such as a cable television network or a digital satellite broadcast, hand-held devices such as smart phones, slate or pad computers, personal digital assistants or camera/cell phone, or multiprocessor systems, microprocessor-based or programmable consumer electronics, network PCs, minicomputers, mainframe computers, or the like.

FIG. 3 provide an illustrative example of a computer (6) having a processor (21), one or more memory elements (5), and a bus (22) (which operably couples certain components of the computer (6), including without limitation the memory elements (5) to the processor (21). The processor (21) can comprise one central-processing unit (CPU), or a plurality of processing units which operate in parallel to process digital information. The bus (22) may be any of several types of bus configurations including a memory bus or memory controller, a peripheral bus, and a local bus using any of a variety of bus architectures. The memory element (5) can without limitation be a read only memory (ROM) (23) or a random access memory (RAM) (24), or both. A basic input/output system (BIOS) (25), containing routines that assist transfer of data between the components of the computer (6), such as during start-up, can be stored in ROM (23). The computer (6) can further include a hard disk drive (26) for reading from and writing to a hard disk (not shown), a magnetic disk drive (27) for reading from or writing to a removable magnetic disk (28), and an optical disk drive (29) for reading from or writing to a removable optical disk (30) such as a CD ROM or other optical media. The hard disk drive (26), magnetic disk drive (27), and optical disk drive (29) can be connected to the bus (22) by a hard disk drive interface (31), a magnetic disk drive interface (32), and an optical disk drive interface (33), respectively. The drives and their associated computer-readable media provide nonvolatile storage of computer-readable instructions, data structures, program modules and other data for the computer (6). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on the hard disk drive (26), magnetic disk (28), optical disk (30), ROM (23), or RAM (24), including an operating system (34), one or a plurality of application programs including but not limited to the software configuration modification program (7) which can implement a graphical user interface (11) or other program interfaces.

The computer (6) may operate in a networked environment using one or more logical connections (35)(36) to connect to one or more remote computers (37). These logical connections (35)(36) are achieved by one or more communication devices (38) coupled to or a part of the computer (6) and the remote computer (37); however, the invention is not limited to a particular type of communications device (38). The remote computer (37) can be another computer, a server, a router, a network PC, a client, a peer device or other common network node, and can include a part or all of the elements above-described relative to the computer (6). The logical connections (35)(36) depicted in FIG. 3 can include a local-area network (LAN) (35) or a wide-area network (WAN) (36). Such networking environments are commonplace in offices, enterprise-wide computer networks, intranets, wireless networks, global satellite networks, cellular phone networks and the Internet (39).

When used in a LAN-networking environment (35), the computer (6) can be connected to the local network through a network interface or adapter (40), which is one type of communications device (38). When used in a WAN-networking environment, the computer (6) typically includes a modem (41), a type of communications device (38), or any other type of communications device for establishing communications over the wide area network (36), such as the Internet (39). The modem (41), which may be internal or external, is connected to the bus (22) via the serial port interface (42). In a networked environment, program modules depicted relative to the computer (6), or portions thereof, may be as to certain embodiments of the invention be stored in one or more remote computers (37). It is appreciated that the network connections shown are exemplary and other means of and communications devices for establishing a communications link between the computers (6) can be used.

The user (3) may enter commands and information through input devices (43) such as a keyboard or a pointing device (44) such as a mouse; however, any method or device that converts user action into commands and information can be utilized including, but not limited to: a microphone, joystick, game pad, touch screen, or the like. A display surface (12) such as a monitor screen or other type of display device can also be connected to the bus (22) via an interface, such as a video adapter (45), or the like. The graphical user interface (11) can be depicted on the display surface (12). In addition to the display surface (12), the computer (6) can further include other peripheral output devices (46) such as speakers and printers; although the peripheral output devices (46) are not so limited.

Now referring primarily to FIG. 1, which also illustrates the components of a particular embodiment of the software configuration modification program (7) which includes a baseline configuration profile generator (46) which functions to create a baseline configuration profile (9) of a software configuration (1) stored in a configuration repository (8) of a memory element (5) of a computer (6). The baseline configuration profile generator (46) can include a baseline configuration profile parser (47). The baseline configuration profile generator (46) can initiate a request to the baseline configuration profile parser (47) to read the software configuration (1) stored in the configuration repository (8). Depending on the software configuration format, one or more of a plurality of alternate baseline configuration profile parsers (48) may be used. As an example, if the software configuration format is in XML, an XML parser (49) can be used. If the software configuration (1) is in another format, one or more of the plurality of alternate parsers (48) can be used. The baseline configuration profile parser (47) creates the baseline configuration profile (9) which includes a listing of all baseline configuration files (10) that represent the current version of the software configuration (1) stored in the configuration repository (8). The baseline configuration profile (9) can divide the listing of all baseline configuration files (10) into schema (50) such as types, attributes, webforms, tables, commands, or the like (as shown in the example of FIG. 5).

Again referring primarily to FIG. 1, the components of the particular embodiment of the software configuration modification program (7) can further include a user configuration profile generator (51) which includes a configuration module (52) and user configuration profile parsers (53). The configuration module (52) can further include a graphical user interface generator (54) and a dependency engine (55).

As to those embodiments which include a graphic user interface generator (54), the user configuration profile generator (54) can initiate a request to the configuration module (52) to activate the graphic user interface generator (54) to generate a graphic user interface (11)(as shown in the example of FIG. 2) capable of interaction with the user (3) which can be depicted on a display surface (12). The graphic user interface generator (54) can further read the current baseline configuration profile (9) generated by the baseline configuration profile generator (46) and depicts the baseline configuration profile (9) on the display surface (12) for viewing by the user (3) allowing the user (3) to select software configuration modifications (2) (as shown in the example of FIG. 5). The user (3) can view schema (50) of the software configuration profile (9) (indicated as "existing" in the example of FIG. 5) and select or enter software configuration modifications (2)(indicated as "new" in the example of FIG. 5). As shown in the embodiment of the graphical user interface shown in FIG. 2, the baseline software configuration profile (9) can be displayed in said graphical user interface (11) as a plurality of categorized schema (50) each selectable to generate a software configuration modification template (73) in which the user (3) can select the software configuration modifications (2) for said baseline configuration profile (9). While the graphical user interface (11) illustrates one approach encompassed by the invention for entry or selection of software configuration modifications (2), selection or entry of software configuration modifications (2) can be achieved without use of the graphical user interface (11), as above described.

Figure 4:
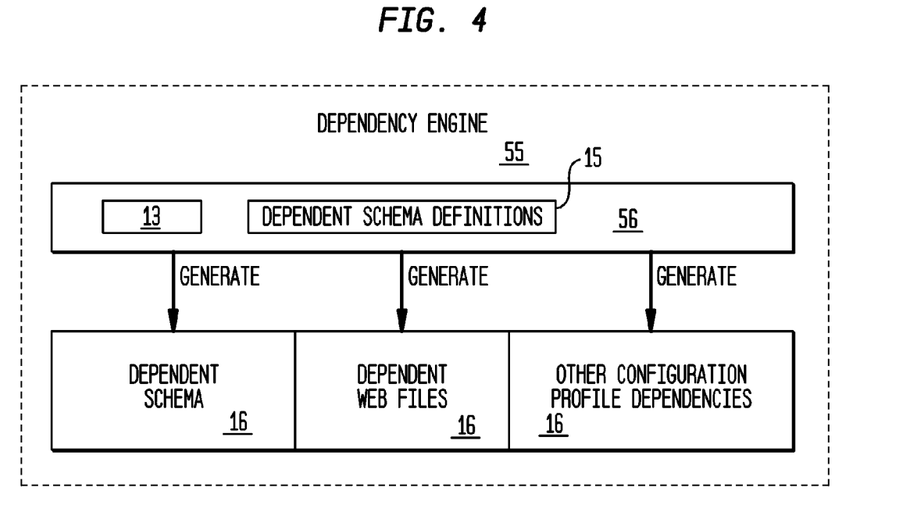
FIG. 4 is an illustration of a particular embodiment of a dependency engine included in the software configuration modification program.

Now referring primarily to FIGS. 1, 4 and 5, the dependency engine (55) can function to concurrently identify dependent schema (13) based selection of the software configuration modifications (2) by the user (3). For the purposes of this invention the term "dependent schema" means those schema configurations of the software configuration (1) which must be updated based upon user (3) selected software configuration modifications (2) to the baseline configuration profile (9). Now referring primarily to FIG. 4, once dependent schema (13) have been identified, a dependent schema generator (56) can function to apply dependent schema definitions (15) on user (3) selected software configuration modifications (2) to automatically update configuration of the identified dependent schema (13) to capture dependent schema configurations (16).

Now referring primarily to the example of FIG. 5, the user (3) views the baseline configuration profile (9) depicted on a display surface (12) which can further be depicted along with or in a graphic user interface (11)(as shown in the example of FIG. 2). The baseline configuration profile (9) in the current example includes Type 1 having Attributes 1, 2 and 3 (labeled "Existing"). The user (3) selects or enters new Attributes X, Y and Z to Type 1 (labeled "New") as software configuration modifications (2). The dependency engine (55) automatically functions to identify dependent schema (13) to which the Attributes X, Y, and Z should be added (shown in the example as dependent schema definitions (15) Type1Create Form, Type1Edit, Type1Search Command, PropertyFile1.properties, and FullTextSearch.xml). The dependent schema definitions (15) can be applied to the software configuration modifications (2)(Attributes X, Y, and Z) and the dependent schema configuration generator (56) automatically generates dependent schema configurations (16).

Again referring primarily to FIG. 1, embodiments of the user configuration profile generator (51) can further include a user configuration profile parser (57) which generates the user configuration profile (14) of the software configuration (1) including the software configuration modifications (2) selected or entered by the user (3), as above described. Depending on the software configuration format, one or more user configuration profile parsers (57) may be used, as above described, to parse the software configuration (1) including the software configuration modifications (2) captured by the dependency generator (55) into the specified format (for example an XML parser (58) or other format parser (59)). The user configuration profile parser (57) creates the user configuration profile (14) which includes a listing of all user configuration profile files (60) that represent the software configuration (1) including the software configuration modifications (2) selected or entered by the user (3) which can be categorized into types, attributes, webforms, tables, commands, or the like.

Figure 6:
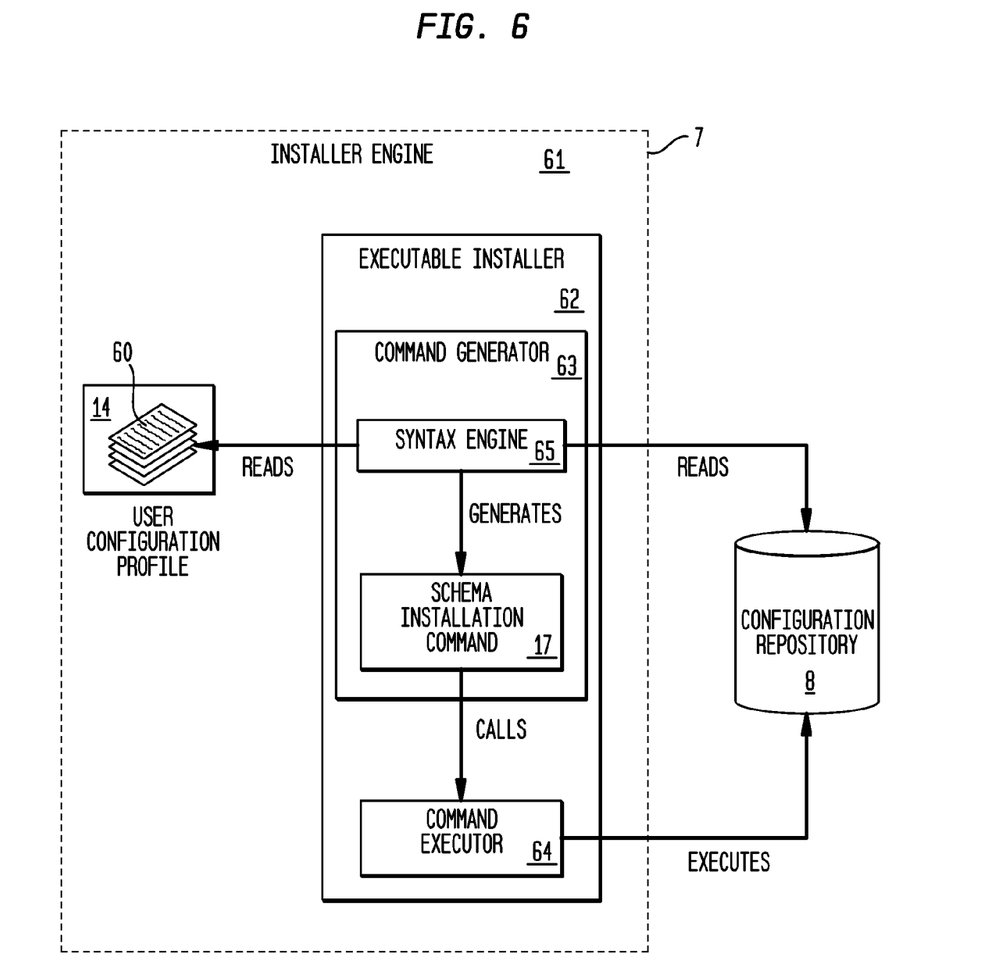
FIG. 6 is an illustration of a particular embodiment of an installer engine included in the software configuration modification program.
Figure 7:
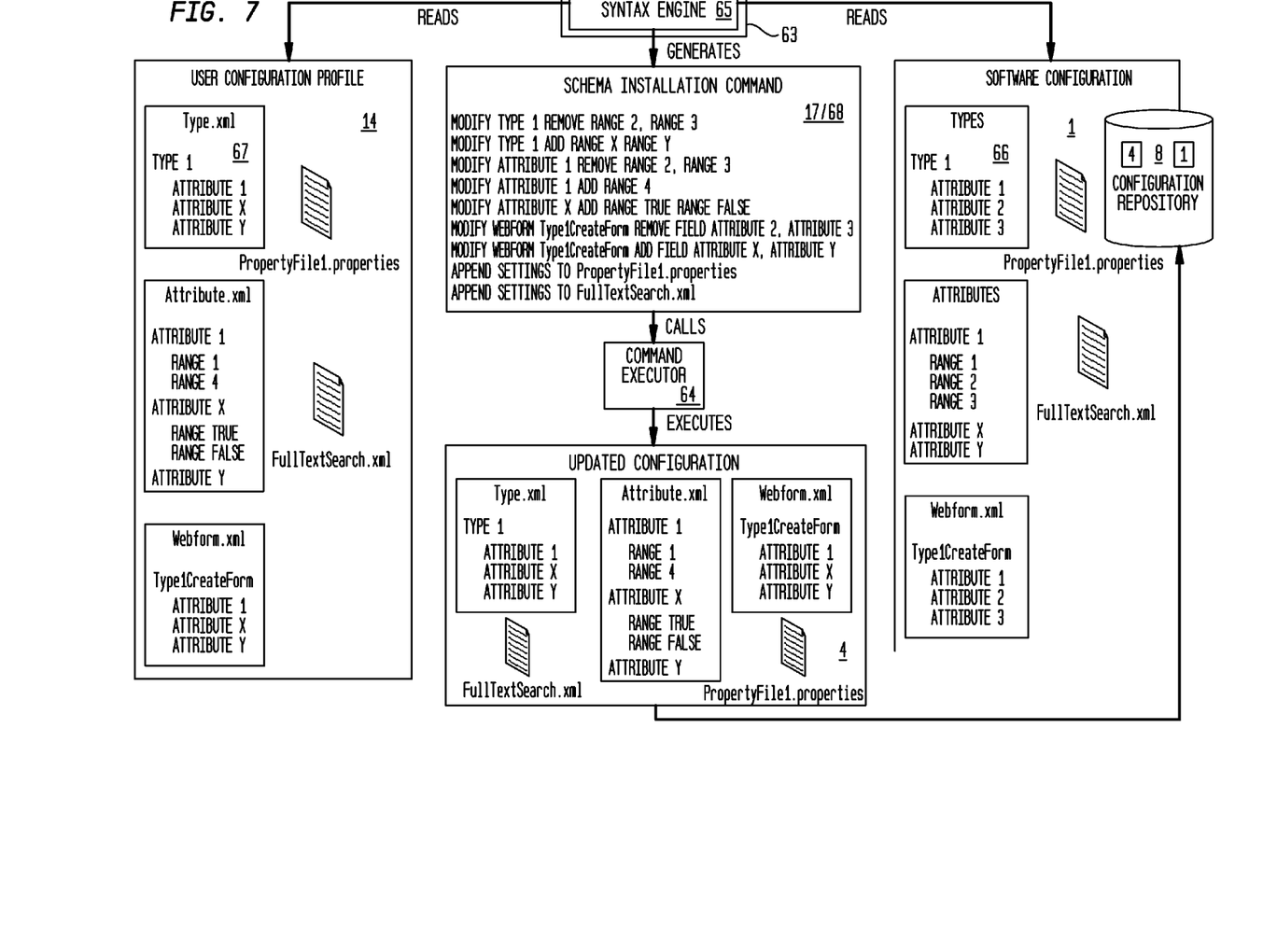
FIG. 7 is an illustration of an exemplary installer engine generating updated software configuration.

Now referring primarily to FIGS. 1, 6 and 7, the components of the particular embodiment of the software configuration modification program (7) can further include an installer engine (61) which functions to build an installer (62) executable by the user (3) whether by interaction with the graphical user interface (11) or other command or instruction, to read the user profile configuration (60) and generate the updated software configuration (4).

Now referring primarily to FIG. 6, particular embodiments of the installer (62) can include a command generator (63) which generates schema installation commands (17) by which the software configuration (1) can be updated with software configuration modifications (2) included in the user configuration profile (14). The command executor (64) functions to execute the schema installation commands (17) to update the software configuration (1) with software configuration modifications (2) to generate the updated software configuration (4).

Now referring primarily to the example of FIG. 7, particular embodiments of the command generator (63) can include a syntax engine (65) which functions to read the software configuration (1) as currently stored in the configuration repository (8) and further functions to read the user configuration profile (14) generated by the user configuration profile generator (51). The syntax engine (65) can further function to compare the user configuration profile (14) to the software configuration (1) currently stored in said configuration repository (8). The syntax engine (65) can further function to generate schema installation commands (17) based on the differences between the user configuration profile (14) and said software configuration (1). For example, the software configuration (1) includes Type1 Attributes 1, 2, and 3 (66). The user configuration profile (14) includes Type 1.xml Type1 Attributes 1, X, and Y (67). Based on this difference, the syntax engine (65) generates the schema installation commands (17) to modify the software configuration (1) in the configuration repository (8) (Modify Type 1 Remove Range 2, Range 3 and Modify Type 1 Add Range X Range Y(68)).

Again referring primarily referring to the example of FIG. 7, the command executor (64) can execute the schema installation commands (17) to install the configuration modifications (68) to update the software configuration (1). The updated software configuration (4) can be stored in the configuration repository (8).

Now referring primarily to FIG. 1, embodiments of the installer engine (61) can further include a validation document generator (69) which renders a validation document (18)(a plain text document) which represents the updated software configuration (4) which includes all the software configuration modifications (2) created by the user (3). Particular embodiments of the validation document generator (69) can include a validation parser (70) which reads the user configuration profile (14). Depending on the software configuration format, one or more validation parser (70) may be used, as above described, to parse the user software configuration profile (14) into a specified format (for example an XML validation parser (71) or other format validation parser (72)). The user configuration profile (14) be formatted by the validation parser (70) readable by a validation document engine (73) which reads the user configuration profile (14) in the parsed documentation format and renders the validation document (18).

As can be easily understood from the foregoing, the basic concepts of the present invention may be embodied in a variety of ways. The invention involves numerous and varied embodiments of an accelerated software services delivery system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a generator" should be understood to encompass disclosure of the act of "generating"—whether explicitly discussed or not—and, conversely, were there effectively disclosure of the act of "generating", such a disclosure should be understood to encompass disclosure of "a generator" and even a "means for generating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a user configuration profile" refers to one or more of those software data models. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It can be further understood that the endpoints of each of the ranges are significant both in relation to the other endpoint, and independently of the other endpoint. When a value is expressed as an approximation by use of the antecedent "about," it can be understood that the particular value forms another embodiment.

Thus, the applicant(s) should be understood to claim at least: i) each computer implemented device herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A computer system for modifying a software configuration, comprising:
    a processor;
    a configuration repository which stores a software configuration;
    a baseline configuration profile generator which creates a baseline configuration profile of said software configuration stored in said configuration repository;
    a user configuration profile generator including:
        a user interface generator which generates a graphical user interface, said user interface capable of interaction with a user to select software configuration modifications for said baseline configuration profile of said software configuration, said baseline configuration profile of said software configuration displayed in said graphical user interface as a plurality of categorized schema, and said user interface capable of interaction with said user to select one of said plurality of categorized schema to generate a corresponding plurality of software configuration modification templates in which said user can select said software configuration modifications for said baseline configuration profile of said software configuration;
        a dependency engine which identifies configuration dependent schema concurrent with said user selection of said software configuration modifications for said baseline configuration profile of said software configuration by interaction of said user with said graphical user interface;
        a dependent schema definitions element which applies dependent schema definitions on said software configuration modifications for said baseline configuration profile of said software configuration;
        a dependent schema configuration generator which generates dependent schema configurations based on said applied dependent schema definitions on said software configuration modifications for said baseline configuration profile of said software configuration; and
        a parser which generates a user configuration profile of said software configuration including said software configuration modifications for said baseline configuration profile of said software configuration selected by said user by interaction of said user with said graphical user interface; and
    an installer engine which builds an installer executable by said user by interaction of said user with said graphical user interface to install said software configuration including said software configuration modifications for said baseline configuration profile of said software configuration selected by said user by interaction of said user with said graphic user interface.

2. The computer system for modifying a software configuration of claim 1, wherein said baseline configuration profile generator comprises a parser which generates a plurality of files in common format which represent said software configuration.

3. The computer system for modifying a software configuration of claim 1, wherein said dependency engine further functions to automatically update said identified configuration dependent schema as said user selects software configuration modifications for said baseline configuration profile of said software configuration.

4. The computer system for modifying a software configuration of claim 1, wherein said installer engine comprises a command generator which generates schema installation commands to install said user configuration profile of said software configuration including said software configuration modifications for said baseline configuration profile of said software configuration selected by said user by interaction of said user with said graphical user interface.

5. The computer system for modifying a software configuration of claim 4, wherein said command generator comprises a syntax engine which functions to:
    read said software configuration as currently stored in said configuration repository;
    read said user configuration profile of said software configuration;
    compare said user configuration profile of said software configuration to said software configuration currently stored in said configuration repository; and
    generate schema installation commands based on differences between said user configuration profile of said software configuration and said software configuration currently stored in said configuration repository.

6. The computer system for modifying a software configuration of claim 5, wherein said command generator further comprises a command executor which executes said schema installation commands to install said user configuration profile of said software configuration including said software configuration modifications for said baseline configuration profile of said software configuration selected by said user by interaction of said user with said graphical user interface.

7. The computer system for modifying a software configuration of claim 1, further comprising a validation document generator which renders a validation document representing said software configuration modifications for said baseline configuration profile of said software configuration selected by said user by interaction of said user with said graphic user interface.

8. The computer system for modifying a software configuration of claim 7, wherein said validation document generator comprises:
- a parser which converts said user configuration profile of said software configuration into a parsed documentation format which can be rendered into said validation document; and
- a validation document engine which reads said user configuration profile of said software configuration in said parsed documentation format and renders said validation document.

\* \* \* \* \*